US005543251A

United States Patent [19]
Taylor

[11] Patent Number: 5,543,251
[45] Date of Patent: Aug. 6, 1996

[54] METHOD OF RECORDING PLURAL HOLOGRAPHIC IMAGES INTO A HOLOGRAPHIC RECORDING MATERIAL BY TEMPORAL INTERLEAVING

[75] Inventor: Bradley K. Taylor, West Chester, Pa.

[73] Assignee: E. I. Du Pont de Nemours and Company, Wilmington, Del.

[21] Appl. No.: 546,179

[22] Filed: Jun. 29, 1990

[51] Int. Cl.$^6$ ............................ G03H 1/26; G03H 1/28; G03H 1/32

[52] U.S. Cl. .................... 430/1; 430/2; 430/271.1; 430/273.1; 430/270.1; 359/3; 359/10; 359/11; 359/22; 359/24; 359/25

[58] Field of Search .................................. 430/1, 2, 271, 430/273, 945, 270.1; 359/22, 3, 24, 25, 35, 10, 1

[56] References Cited

U.S. PATENT DOCUMENTS

| | | | |
|---|---|---|---|
| 3,503,050 | 12/1965 | Schoels et al. | 430/1 |
| 3,568,526 | 4/1972 | Haugh | 96/27 |
| 3,658,526 | 4/1972 | Haugh | 430/1 |
| 3,736,040 | 5/1973 | Zivi et al. | 359/27 |
| 3,856,986 | 12/1974 | Macovski | 359/10 |
| 3,891,976 | 6/1975 | Carlsen | 359/22 |
| 4,094,011 | 6/1978 | Nagao | 430/1 |
| 4,155,630 | 5/1979 | Ih | 359/24 |
| 4,213,193 | 7/1980 | Reid et al. | 359/22 |
| 4,703,994 | 10/1987 | Leib et al. | 359/22 |
| 4,707,135 | 11/1987 | Swain et al. | 356/351 |
| 4,746,940 | 5/1988 | Lee | 346/160 |
| 4,859,548 | 8/1989 | Heise et al. | 430/1 |
| 4,889,780 | 12/1989 | Cosner | 430/1 |
| 4,942,112 | 7/1990 | Monroe et al. | 430/1 |

FOREIGN PATENT DOCUMENTS 2149880  6/1990  Japan ............................ 359/1

OTHER PUBLICATIONS

Gladden, J. W.; "Review of Photosensitive Materials for Holographic recording" US Army Report ETL–0128 Apr. 1978 pp. 57–64.

Dana Z. Anderson et al, Dynamic Optical Interconnects: Volume Holograms as Optical Two–Port Operators, *Applied Optics*, 26, 5031–5038, 1 Dec. 1987.

Kristina M. Johnson et al, Holographic Reciprocity Law Failure, *Applied Optics*, 23, 218–227, 15 Jan. 1989.

A. C. Strasser et al, Procedure for Recording Multiple–Exposure Holograms with Equal Diffraction Efficiency in Photorefractive Media, *Optics Letters*, 14, 6–8, 1 Jan. 1989.

LaMacchia, Vincelette, "Comparison of the diffraction efficiency of multiple exposure and single exposure holograms", Applied Optics, vol. 7 No. 9, Sep. 1968, pp. 1857–1858.

H. J. Caufield, Ed., "Handbook of Optical Holography", Academic Press, Inc., 1979, Ch. 5, §2, pp. 191–197.

R. J. Collier, et al., "Optical Holography", Academic Press, Inc., 1971, Ch. 9, §8, pp. 261–263; Ch. 16, §3, pp. 461–477.

*Primary Examiner*—Martin J. Angebranndt

[57] ABSTRACT

Holographic images are constructed in a recording material in accordance with a temporal interleaving technique in which a first set of images is constructed for a predetermined first imaging time with a predetermined first time gap being defined between each of the images. Thereafter, in accordance with a subsequent predetermined sequence a subsequent set of images is constructed into the same predetermined location. The image sets have at least one member in common. In one aspect all of the images are constructed into the same predetermined defined region of the holographic recording material (an angle hologram). In another aspect the predetermined defined region into which each of the images is constructed is separate from all other regions of the holographic recording material (a spatial hologram).

88 Claims, 7 Drawing Sheets

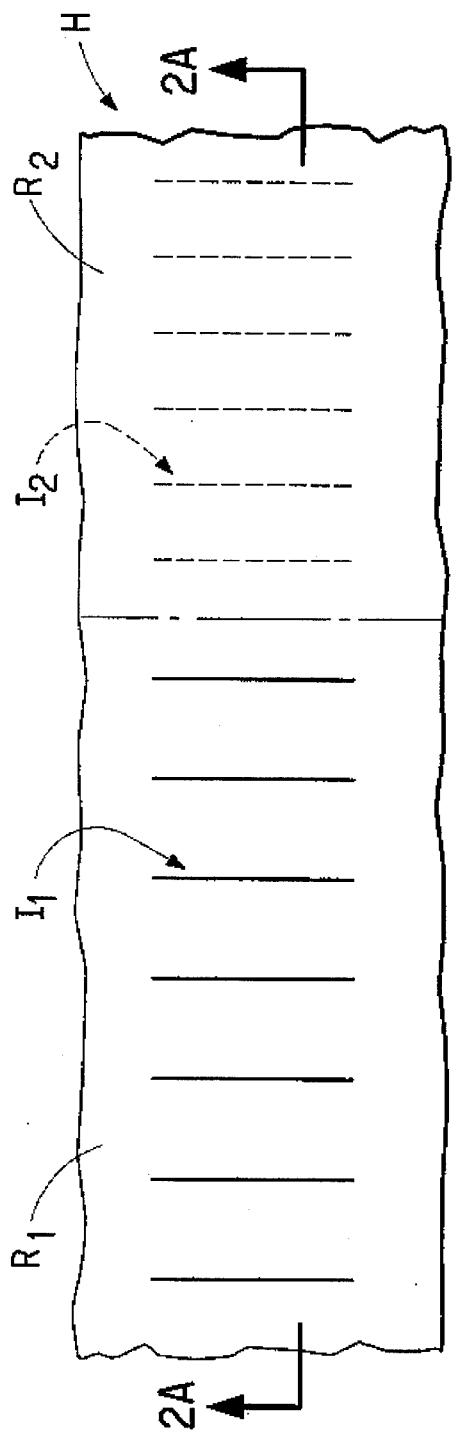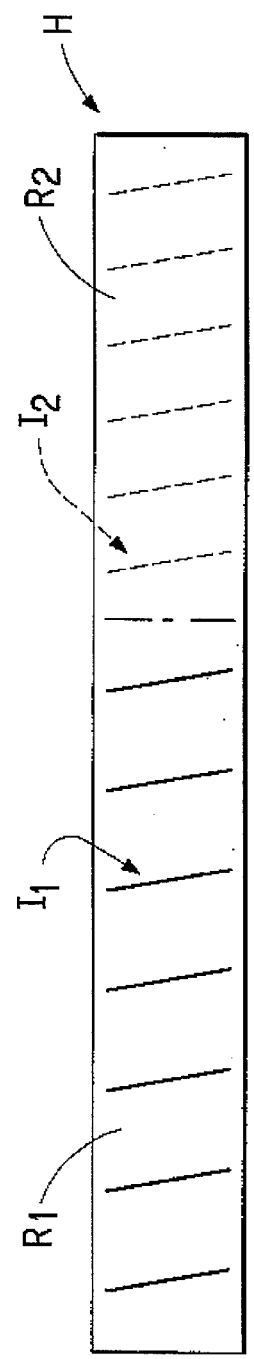
FIG. 2
FIG. 2A

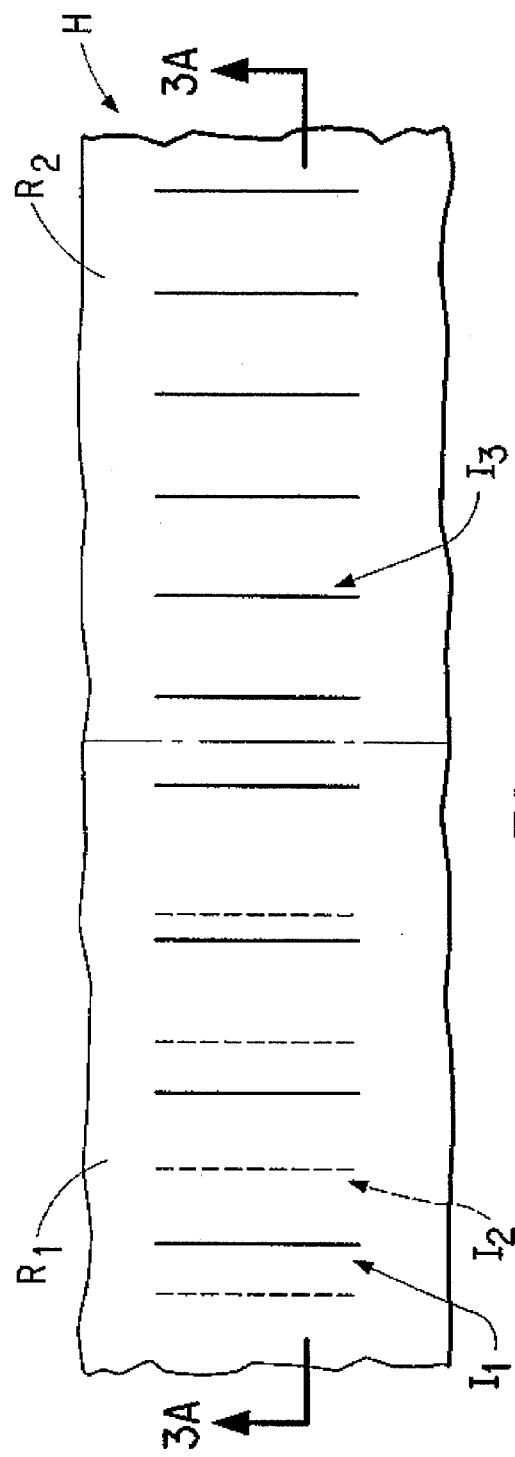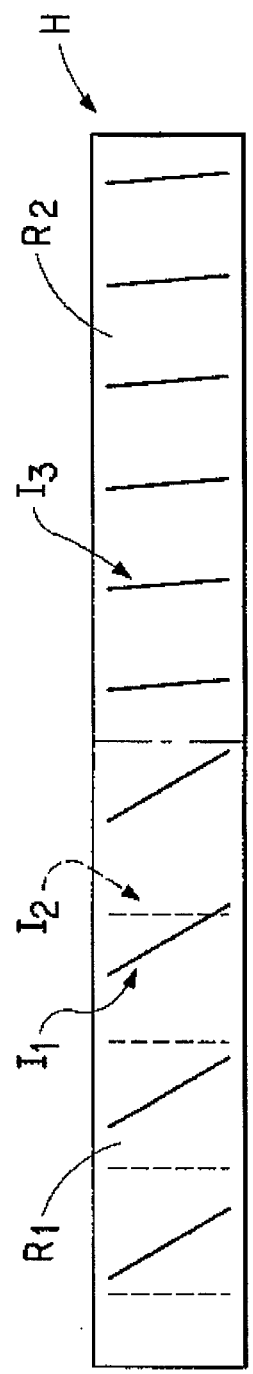

METHOD OF RECORDING PLURAL HOLOGRAPHIC IMAGES INTO A HOLOGRAPHIC RECORDING MATERIAL BY TEMPORAL INTERLEAVING

CROSS REFERENCE TO RELATED APPLICATION

Subject matter disclosed herein is disclosed and claimed in application, Ser. No. 07/546,180, now U.S. Pat. No. 5,098,176, "Apparatus For Recording Plural Holographic Images Into A Holographic Recording Material By Temporal Interleaving" filed contemporaneously herewith in the name of William Edward Wolf and assigned to the assignee of the present invention.

BACKGROUND OF THE INVENTION

1. Field of the Invention

This invention relates generally to a method of recording holographic images and, in particular, to a method for recording a plural number of such holographic images into a recording material.

2. Description of the Prior Art

Optical holography, often called "wavefront reconstruction", may be described as the recording of a holographic image within a holographic recording material. Conventional holographic recording materials include silver halide emulsions, dichromated gelatin, thermoplastic media and time-dependent diffusion media.

A standard technique of producing a holographic image is by the interference of two coherent beams of light, respectively termed an "object beam" and a "reference beam". Both beams are generated from the same coherent source (typically a laser) to insure sufficient mutual coherence to form a stable interference pattern. To produce the holographic image the object beam is typically spatially modulated, e.g., it is reflected from a three-dimensional object. The reference beam is typically a non-spatially modulated coherent beam. The object beam and the reference beam are brought together (that is, spatially overlapped) at a predetermined position within a holographic recording material. It is the coherent addition of the wavefronts of the object beam and the reference beam within the material that constructs a holographic image within the recording material. In a similar manner holographic images may be created with multiple reference and object beams. The holographic image so constructed may also be referred to as the interference pattern, the holographic grating, the hologram, or simply, the image.

The term "multiplexed" holographic image refers to the construction of more than one holographic image within a holographic recording material. A variety of wavefront reconstruction options is permitted using multiplexed holographic images. Multiplexed holographic images in some cases make efficient use of the available area or volume of the recording medium. The holographic images produced by combinations of several reference and object beams may be constructed in the same physical region in the recording material. Alternatively, each of the holographic images may be constructed in a respective region of the recording material (spatial multiplexing).

Conventional methods used to multiplex a plural number N of holographic images into the same volume of the holographic recording material use two basic approaches: a simultaneous exposure technique or a sequential exposure technique. These two approaches are discussed in La Macchia and Vincelette, "Comparison of the Diffraction Efficiency of Multiple Exposure and Single Exposure Holograms", Applied Optics, Vol. 7, No. 9, pp. 1857–1858, September 1968) and in R. J. Collier et al., "Optical Holography", Academic press, Inc., 1971 and H. J. Caulfield, Ed., "Handbook of Optical Holography", Academic Press, Inc., 1979. These methods are particularly important for volume holography, where multiplexing N holograms at different angles (angle multiplexing) in the holographic recording material optimizes information recording density.

Simultaneous exposure requires that the optical beams constructing all N holographic images be generated simultaneously, so that only a single exposure of the holographic recording material is made. Perceived disadvantages of this approach include the difficulty in simultaneously generating beams for the N holographic images when N is large, and the problem of crosstalk between reference beams and object beams when constructing the N holograms.

Holographic exposure of conventional holographic recording materials, such as silver halide emulsions, dichromated gelatin, and thermoplastic media, involves recording a latent holographic image in the material. The final holographic image is obtained by a developing and fixing process. In the course of making multiplexed holographic images by sequential exposure, for example, the recording material may be left in the dark between exposures for extended periods of time while the recording apparatus is being modified. Subsequent exposures will simply add to the latent image that already exists.

Photopolymeric holographic recording materials are now known. Application Ser. No. 07/144,281, now U.S. Pat. No. 4,994,347, application Ser. No. 07/144,355, now U.S. Pat. No. 4,942,112, and application Ser. No. 07/144,840, now U.S. Pat. No. 4,942,102 and U.S. Pat. No. 4,950,567, all filed Jan. 15, 1988 and all assigned to the assignee of the present invention disclose and claim holographic recording materials. Holographic images are recorded in a photopolymer recording medium as a result of diffusion of unexposed monomer towards areas exposed with the highest intensity of incident light, creating a density gradient in the material which corresponds to the optical intensity gradient in the holographic image. After polymerization the higher density areas have a larger index of refraction than the lower density areas, thus forming a dielectric (phase) grating.

Identical serially recorded exposures, using typical exposure energies (ten milliJoules per square centimeter) recorded on the order of several seconds apart, are not recorded with equal strength in the material. This is due to the dynamics of the diffusion mechanism. Furthermore, monomer does not flow as readily to the second exposure as it does to the first, and not as much flows per unit of incident optical radiation.

When using a photopolymeric holographic recording material based on a time-dependent diffusion mechanism the material should not, in general, be left in the dark for extended periods of time (several seconds or minutes) between sequential exposures if one expects to achieve performance comparable to conventional holographic materials. Since in the holographic materials the latent image mechanism is replaced by a process involving the dynamic diffusion of molecules in the material the possibility of reciprocity failure exists. Reciprocity failure is due to the fact that the index of refraction change is not only a function of the irradiance-exposure time product, but also is dependent on the magnitude of the irradiance on the exposure time. In addition, the available modulation range (i.e., the possible index of refraction change) of the photopolymerizable holographic material varies with time because the diffusion mechanism and polymerization continues in the dark.

Conventional sequential multiple-exposure angle multiplexing has been demonstrated in current photopolymer formulations. However the resulting diffraction efficiencies are lower than predicted for this type of exposure, possibly due to the diffusion mechanism and its reversibility properties.

In view of the foregoing it is believed advantageous to provide a sequential exposure technique for multiplexing N holograms into a photopolymerizable holographic material which can overcome or minimize the dynamic effects of the time-dependent diffusion in the material.

—o—0—o—

Conventional apparatus for forming sequential multiplexed holograms typically include a manual or automated (e.g., galvanometer controlled) mirror whereby the location and/or angle of incidence of at least either the object beam or the reference beam on the holographic recording material may be controlled. However, the degree of control over incident beam location and/or angle of incidence required in the formation of sequential multiplexed holograms is not a significant factor. So long as the mirror control system is able to place the incident beam within the region of the recording material dedicated to a given holographic image, the control system is sufficient for the purpose of forming sequential multiplexed holograms. Similarly, the beam positioning requirements placed on conventional apparatus for reading a sequential multiplexed hologram are not unduly stringent. So long as the reading beam is placed within the range of Bragg angle appropriate for the thickness of the holographic material, the angle between the object and reference beam and the wavelength of the light being used, the signal-to-noise ratio of the hologram is acceptable.

For reasons that become apparent hereinafter it is believed advantageous to provide an apparatus for forming holograms in which the position of either an object or a reference beam may be repeatably and precisely controlled.

SUMMARY OF THE INVENTION

The present invention relates to a method of recording a predetermined number of holographic images into a holographic recording material. The method of the present invention may be used both for angularly multiplexed and for spatially multiplexed holograms.

In accordance with the present invention each one of a set of N holographic images is constructed into a predetermined defined region of the recording material in accordance with a first predetermined sequence. Each holographic image is constructed for a predetermined first imaging time with a predetermined first time gap being defined between each of the images. Thereafter, in accordance with a subsequent predetermined sequence, each one of a predetermined number of the set of N holographic images is constructed into the same predetermined region. Each holographic image is constructed into the predetermined defined region of the holographic recording material for a predetermined corresponding second imaging time. A predetermined second time gap is defined between each of the images in the second sequence. Preferably, but not necessarily, the holographic images constructed during the second sequence includes all of the images constructed in the first sequence.

In accordance with one aspect of the invention all of the images are constructed into the same predetermined defined region of the holographic recording material (an angle hologram). In another aspect of the present invention the predetermined defined region into which each of the N images is constructed is separate from all other regions of the holographic recording material (a spatial hologram). Alternatively, in accordance with another aspect of the invention some of the N images may be constructed in the same region of the holographic recording material and each one of the others of the N images may be constructed into spatially separate regions of the holographic recording material.

The predetermined first and second imaging times are preferably, but need not be, equal. The predetermined first and second sequences are preferably, but need not be, the same. To remain within the contemplation of the invention the first and the subsequent sequences should each contain at least one common member. The predetermined first and second time gaps are preferably, but need not be, equal.

In the preferred instance the holographic recording material is a photopolymerizable recording material comprising (a) a polymeric binder selected from the group consisting of cellulose esters, polystyrene, stryene copolymers containing at least 60% by weight styrene, polymethyl methacrylate, polyvinylbutryal, polyvinylformal, polyvinyl acetate and copolymers of vinyl acetate with tetrafluoroethylene and hexafluoropropylene containing up to about 25% by weight fluorine; (b) a liquid ethylenically unsaturated monomer, the monomer being capable of free-radical initiated addition polymerization; and (c) a photoinitiator system that activates polymerization of said unsaturated monomer on exposure to actinic radiation.

The holographic images are recorded by constructing holographic images sequentially with short exposure times so that rapid interleaving of multiple holograms occurs. By exposing the photopolymer material in a time-multiplexed manner the recording material "sees" all of the holographic images and, due to the rapid temporal interleaving, responds to each equally with the diffusion process. By temporally interleaving the holographic images at a rate much faster than the diffusion mechanism of the photopolymer, the present invention circumvents, or at least minimizes, the problems associated with monomer flow in response to subsequent exposures and the reduction in monomer flow per unit of incident optical radiation.

—o—0—o—

In another aspect, the present invention relates to an apparatus for recording plural holographic images using the temporal interleaving method summarized above. The holographic recording apparatus in accordance with the present invention includes a control arrangement whereby the angle of incidence of either an object beam or a reference beam on the holographic recording material may be repeatably and precisely controlled. The recording apparatus comprises means for forming an object beam and a reference beam and a galvanometer controlled mirror the position of which controls the angle of incidence of at least one of the object beam and a reference beam onto the holographic recording material. A laser source and associated detector are respectively located to direct a laser beam toward the mirror and to intersect the reflection of the beam therefrom. The detector is responsive to the reflected beam incident thereon to generate first and second electric currents the magnitude of each of which is functionally related to the position on the detector at which the reflected laser beam is incident and to the power output of the laser source.

The holographic recording apparatus further includes a control system for generating a galvanometer position signal to control the position of the galvanometer driven mirror (and thereby the angle of incidence of a beam onto the holographic recording material). The control system itself comprises means responsive to the first and the second currents for forming the ratio of the sum and difference thereof thereby to form an actual mirror position signal that is independent of the power output of the laser source, and an integrator responsive to the error between the signal representative of the actual mirror position and a reference signal representative of a predetermined position of the mirror for forming the galvanometer position signal at the output thereof.

BRIEF DESCRIPTION OF THE DRAWINGS

The invention will be more fully understood from the following detailed description thereof, taken in connection with the accompanying drawings which form a part of this application and in which:

FIGS. 1, 2, and 3 are highly stylized pictorial representations of various arrangements of multiplexed plural holographic images recorded in a predetermined defined regions of a holographic recording material by temporal interleaving in accordance with the method of the present invention;

FIGS. 1A, 2A, and 3A are side sectional views of the holographic recording media of FIGS. 1, 2 and 3 taken along the respective section lines therein;

DETAILED DESCRIPTION OF THE INVENTION

Figure 1:
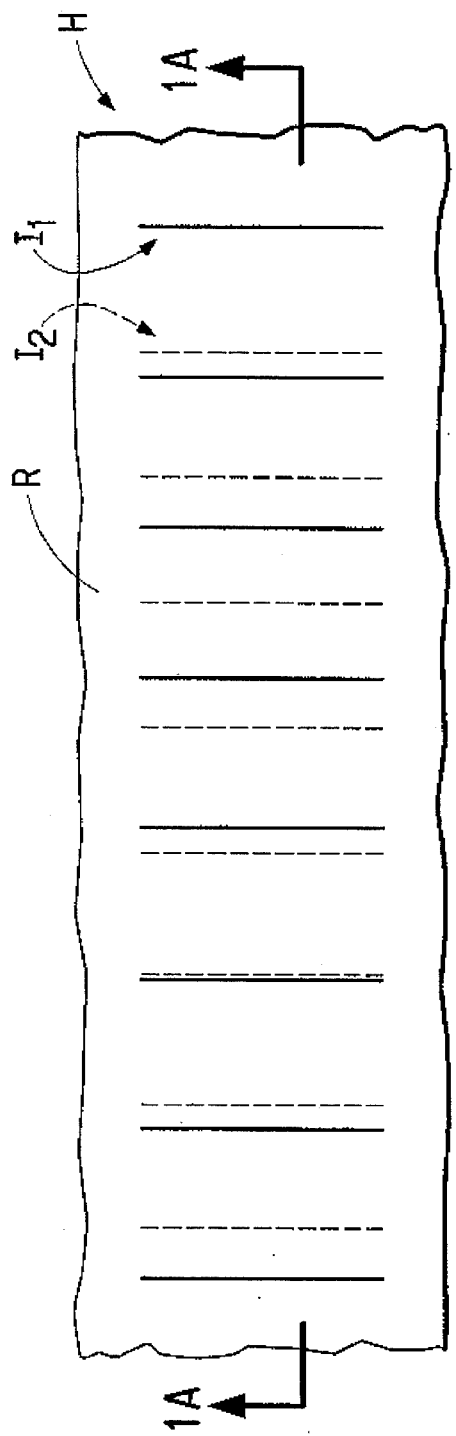

Throughout the following detailed description similar reference numerals refer to similar elements in all figures of the drawings.

Figure 1A:
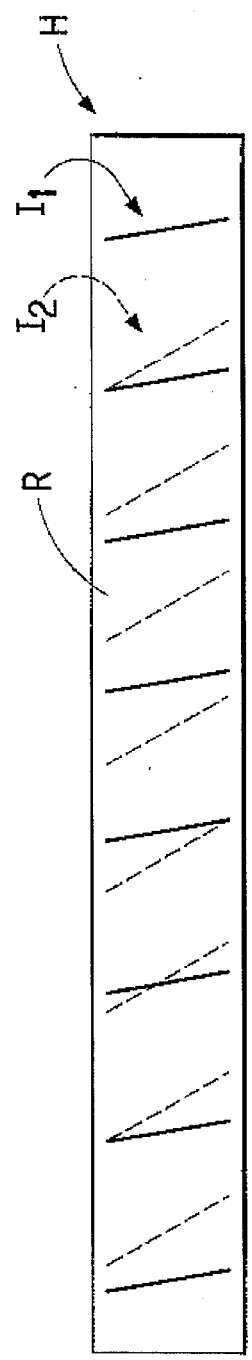

Referring to FIGS. 1, 2, and 3 shown are highly stylized pictorial representations of various arrangements of multiplexed plural holographic images I recorded in predetermined defined region(s) R of a holographic recording material generally indicated by the reference character H using the temporal interleaving method in accordance with the present invention, while FIGS. 1A, 2A, and 3A are side sectional views of the holographic recording material H of FIGS. 1, 2 and 3 taken along the respective section lines therein. It should be understood that a given holographic recording material H may contain more than the number of region(s) R shown in FIGS. 1 to 3, and that a given region R of a holographic recording material H may contain more than the number images I shown in FIGS. 1 to 3. FIGS. 1 to 3 are to be construed as being illustrative of the various possible arrangements of holographic images able to be recorded within predetermined defined region(s) of the recording material H using the method of the present invention. Although any holographic recording material may be used with the method of the present invention, a photopolymerizable holographic recording material is preferred. The composition of the photopolymerizable holographic recording material preferably used in the method of the present invention will be more fully discussed hereinafter.

FIGS. 1 and 1A illustrate the arrangement of an angularly multiplexed holographic image recorded in accordance with the present invention. An "angularly multiplexed" holographic image (or "angle hologram"), as the term is used herein, denotes the presence of at least two different holographic images $I_1$ and $I_2$ recorded in the same predetermined defined physical region R of the holographic material H. Forming angle holograms is most useful in volume holography, where the grating spacing is small with respect to the thickness of the recording material, as described in Chapter 9, Section 8 of Collier text referenced earlier. For simplicity of illustration the images shown in FIGS. 1 through 3A are the interference pattern fringe spacing with the first image $I_1$ being indicated in solid lines while the second image $I_2$ is indicated by dashed lines.

FIGS. 2 and 2A illustrate the arrangement of a spatially multiplexed holographic image recorded in accordance with the present invention. As the term is used herein a "spatially multiplexed" holographic image (or "spatial hologram") denotes the presence of only a single holographic image within a given region R of the holographic material H. Thus, as seen in FIG. 2, each of the holographic images $I_1$ and $I_2$ is recorded in a respective predetermined defined physical region $R_1$ and $R_2$ of the holographic material H. The predetermined defined region $R_1$ of the recording material H in which the image $I_1$ is constructed is separate from the predetermined defined region $R_2$ of the recording medium H in which the image $I_2$ is constructed. By "separate" it is meant that even though each the predetermined defined region of the material is physically integral with all of the other regions in the sense that a continuous sheet of holographic recording material is defined, each such region is distinct from the others on the sheet.

Combinations of angularly multiplexed and spatially multiplexed holographic images are possible. FIGS. 3 and 3A illustrate the combination of angularly multiplexed holographic images $I_1$ and $I_2$ recorded in a predetermined defined region $R_1$ of the recording material H while a spatially multiplexed holographic image $I_3$ is recorded in a separate region $R_2$ of the holographic recording material H. It lies within the contemplation of this invention to record one or more additional image(s) in the region $R_2$, in effect defining angle holograms (as that term is defined herein) in each of the regions $R_1$ and $R_2$. It should be noted that in some instances such an arrangement has been termed in the art as "both a spatially and an anglarly multiplexed hologram".

—o—0—o—

The method of temporal interleaving of N holographic images $I_1$ to $I_N$ into a recording material H in accordance with the present invention may now be set forth.

In accordance with a first predetermined sequence each one of a set of N holographic images is constructed into a predetermined defined region R of the recording material in accordance with a first predetermined sequence. Depending upon whether an angularly or a spatially multiplexed hologram is being recorded, each image may be recorded in the same predetermined defined region of the recording material (i.e., an angularly multiplexed hologram, e.g., FIG. 1) or each image may be recorded in a predetermined defined region that is separate from all other regions of the recording material (i.e., a spatially multiplexed hologram, e.g., FIG. 2). As discussed above, a combination of the angularly multiplexed or spatially multiplexed holograms in the same recording material H (FIG. 3) lies within the contemplation of the present invention.

Each holographic image in the set of N images is constructed for a predetermined first imaging time with a predetermined first time gap being defined between each of the images. Thereafter, in accordance with a subsequent predetermined sequence, each one of a predetermined number of the set of N holographic images is constructed into the same predetermined location into which it was constructed during the first sequence. During the subsequent sequence each holographic image is constructed into the predetermined defined region of the holographic recording material for a predetermined corresponding second imaging time. A predetermined second time gap is defined between each of the images in the subsequent sequence.

It should be understood that the subsequent sequence may be constructed more than twice. Stated alternatively, more than two exposure sequences may be used, if desired. In general, M number of exposure sequences may be used, where M can have any convenient value (including being equal to N).

It lies within the contemplation of the invention that any subsequent sequence(s) of exposures may include any predetermined number (i.e., subset) of the set of N images constructed during the first sequence. The term "sequence" as used herein is meant to denote the order in which the members of the set of holographic images is constructed into the material. It is preferable, although not necessary, that the same order of image exposure occurs during any subsequent sequence as occurred in the first sequence.

It is expressly noted that in some instances a subsequent set may contain a greater number of images than the first set of images. The present invention is to be construed to cover such situations. Thus, temporal interleaving in accordance with the present invention may be used for the exposure of two predetermined sets of holographic images, each containing some predetermined number of images $N_1$ and $N_2$, respectively, so long as the first and subsequent sets of holographic images have at least one member in common.

In all situations the construction of an image is effected by relatively short exposures. If the recording material is a photopolymerizable recording material the timing of the subsequent sequence with respect to the first is governed in accordance with (i.e., faster than) the diffusion rate of the monomer in the material.

The method of the present invention may be more clearly understood from the following typical activity schedule for its practice. A temporally interleaved exposure schedule for N images follows, with the interleaving period T denoting the time required to expose each of the N images in the sequence. It is assumed that each sequence of exposures contains all N images. If some subset of the N images are contained within a given sequence then the periods $T_p$ of such sequences varies (assuming uniform exposure times and gap times).

| SCHEDULE |
|---|
| PERIOD $T_1$, SEQUENCE 1 |
|     expose image 1 for imaging time $t_{11}$ |
|         gap $t_{g11}$ |
|     expose image 2 for imaging time $t_{12}$ |
|         gap $t_{g12}$ |
|     . . . |
|     expose image N for imaging time $t_{1N}$ |
|         gap $t_g1N$ |
| PERIOD $T_2$, SEQUENCE 2 |
|     expose image 1 for imaging time $t_{21}$ |
|         gap $t_{g21}$ |
|     expose image 2 for imaging time $t_{22}$ |
|         gap $t_{g22}$ |
|     . . . |
|     expose image N for imaging time $t_{2N}$ |
|         gap $t_{g2N}$ |
|     . . . |
| PERIOD $T_3$, SEQUENCE 3 through |
| PERIOD $T_{M-1}$, SEQUENCE M-1 |
|     . . . |
| PERIOD $T_M$, SEQUENCE M |
|     expose image 1 for imaging time $t_{M1}$ |
|         gap $t_{gM1}$ |
|     expose image 2 for imaging time $t_{M2}$ |
|         gap $t_{gM2}$ |
|     . . . |
|     expose image N for imaging time $t_{MN}$ |
|         gap $t_{gMN}$ |

It is understood that during the second and subsequent sequences (if any) each one of a predetermined number of the set of N holographic images is constructed into the same predetermined location into which it was constructed during the first sequence.

The total imaging time for a single image k is given by $$\sum_{i=1}^{M} (t_{ik}).$$

As noted earlier, it lies within the contemplation of the invention that the imaging times for each image need not be equal, the time gaps need not be equal, and/or that each sequence need not contain all of the N images in the set of holographic images. It should also be understood that either an angularly multiplexed hologram (i.e., two or more images) or an spatially multiplexed hologram (i.e., one image) may be constructed in a given region R of the recording material.

—o—0—o—

Figure 4:
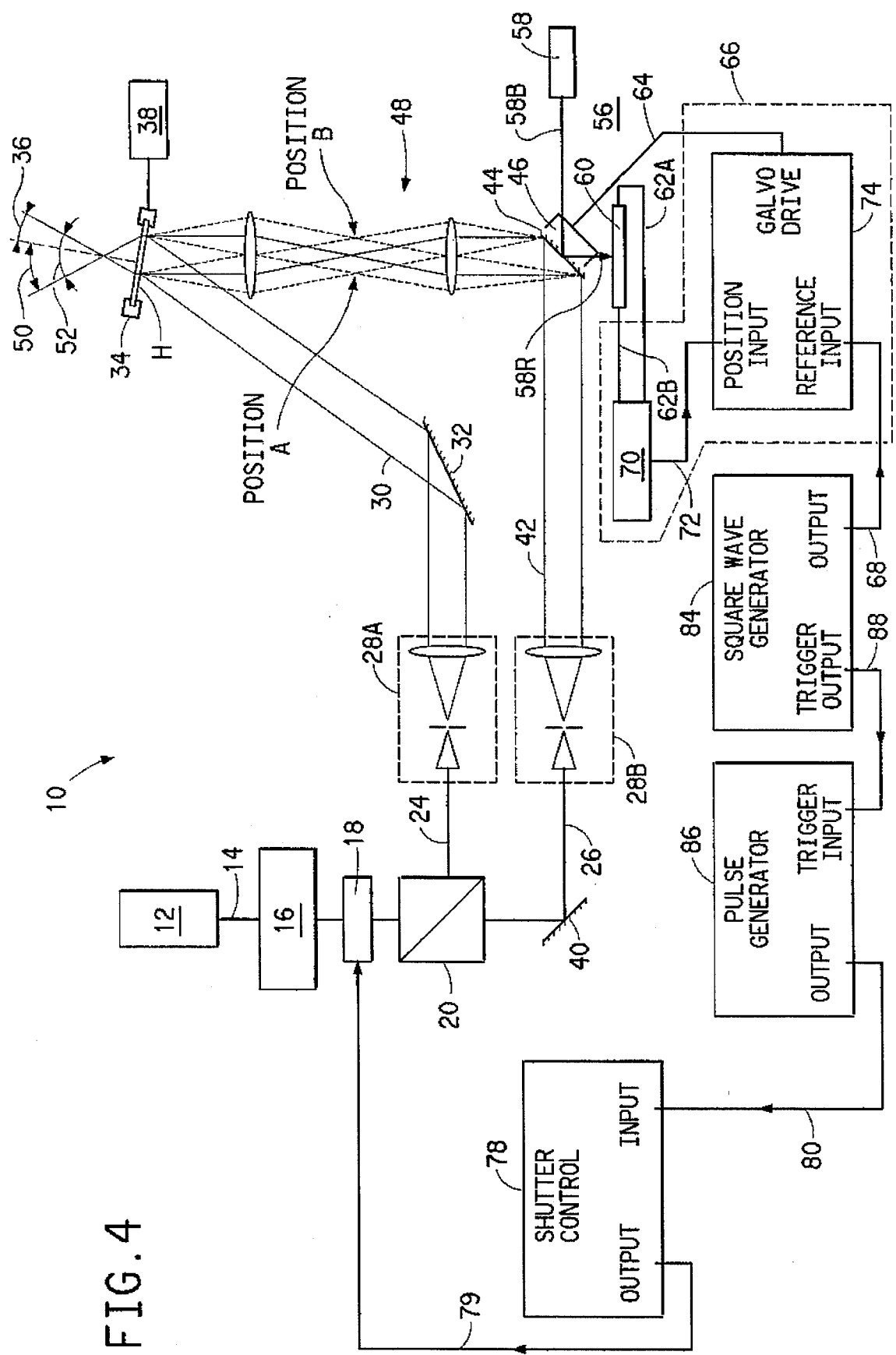
FIG. 4 is a schematic illustration of an apparatus in accordance with another aspect of the present invention useful for recording multiplexed plural holographic images in predetermined defined region(s) of a holographic recording material by temporal interleaving.

With reference now to FIG. 4 shown is a schematic illustration of an apparatus generally indicated by reference character 10 suitable for use in accordance with the method of the present invention for recording a plural number N of two-beam holographic images on a recording material H. Although any holographic recording material may be used, in the preferred instance the recording material H is a photopolymerizable film the details of which are fully set forth hereinafter. The apparatus 10 is able to be used to form both spatially multiplexed holographic images and angularly multiplexed holographic images.

The apparatus 10 includes a laser source 12 which produces a beam 14. The beam 14 passes through a beam attenuator 16 and a controllable shutter 18 and is incident upon a variable beam splitter 20. The beam splitter 20 bifurcates the beam 14 into an object beam path generally indicated by the character 24 and a reference beam path generally indicated by the character 26. Suitable for use as the source 10 is a twenty (20) Watt argon laser such as that manufactured by Spectra-Physics, Inc. of Mountain View, Calif. and sold as model 2045. The attenuator is preferably implemented using a device manufactured by Newport Research Corporation, Fountain Valley, Calif. and sold as model 935-5 Attenuator. The controllable shutter 18 is preferably implemented using a device manufactured by Vincent Associates, Rochester, N.Y., and sold as model 225L2AOZ5.

The portion of the beam turned ninety degrees by the action of the beam splitter 20 propagates along the object beam path 24 through a spatial filter/collimator assembly 28A to produce a collimated object beam indicated by the reference character 30. The spatial filter/collimator assembly 28A is preferably implemented using a 40× microscope objective and a ten micron pinhole mounted in a model 910-B spatial filter and a 63.5 mm focal length achromatic lens. These devices are all available from Newport Research Corporation.

The object beam 30 is directed by a mirror 32 onto the holographic recording material H. The material H is itself mechanically secured by a plateholder schematically indicated at reference character 34 in any convenient manner. The mirror 32 is arranged such that the object beam 30 deflected from the mirror impinges on the holographic recording material H at a predetermined object beam angle 36. The surface of the recording material H is termed herein as "the film plane". The object beam angle 36 is measured with respect to a normal to the film plane. To form spatially multiplexed holograms the plateholder must be able to be translated in mutually orthogonal directions in the film plane. To effect such translation an actuator generally indicated by the reference character 38 is operatively associated with the plateholder 34. The actuator 38 may be implemented in any convenient fashion, such as by manual or motorized translator stages, as should be apparent to those skilled in the art.

The portion of the beam 14 that continues through the beam splitter 20 along the reference beam path 26 is turned ninety degrees by a mirror 40 toward a spatial filter/collimator assembly 28B. The spatial filter/collimator assembly 28B is similar to the assembly 28A described earlier. The collimated reference beam 42 emanating from the assembly 28B is turned by a double-sided mirror 44 mounted on a galvanometer 46. Suitable for use as the galvanometer 46 is a device manufactured by General Scanning Inc., Watertown, Mass., and sold as model G120PD Galvo.

The reference beam 42 passes through a unity angular magnification Keplerian afocal telescopic imaging system 48 that directs the reference beam 42 towards the film plane at a predetermined reference beam angle 50, also measured with respect to the normal from the film plane. The sum of the object beam angle 36 and the reference beam angle 50 defines an interbeam angle 52.

The object beam 30 and the reference beam 42 are coincident at the film plane. Since both beams 30, 42 are sufficiently coherent they produce an interference pattern, or holographic image, at the film plane. The holographic image is recorded in the recording material H. The combined action of the attenuator 16 and the variable beam splitter 20 controls the intensities of the object beam and the reference beams 30 and 42, respectively.

Rotation the mirror 44 under control of the galvanometer 46 changes the angle at which the reference beam 42 is input to the telescopic imaging system 48. Since the reflection of the reference beam 42 from the mirror 44 is imaged by telescopic imaging system 48 at the plane of the holographic recording material H any change in the position of the mirror 44 produces a corresponding equal change in the reference beam angle 50, assuming that the reference beam 42 remains in the aperture of the imaging system 48. The reference beam 42 remains coincident with the object beam 30 for any rotation of the mirror 44. The position of the mirror 44 under control of the galvanometer 46 thereby varies and controls the reference beam angle 50, and thus the interbeam angle 52.

An interference pattern (image) suitable for recording as a holographic image is constructed at the film plane (the surface of the holographic material H) when the shutter 18 is open. The properties of the holographic image (namely the interference fringe spacing and fringe slant) are determined by the reference beam angle 50 and the object beam angle 36. Thus a different holographic image may be recorded in the material H by changing the reference beam angle 50.

The actual position of the mirror 44 is derived from a mirror position sensing system generally indicated at reference character 56. The mirror position sensing system 56 includes a laser source 58 and an associated detector 60. The source 58 and the detector 60 are respectively located to direct a laser beam 58B toward the undersurface of the mirror 44 and to intersect the reflected beam 58R therefrom. The suitable biased detector 60 is responsive to the reflected beam 58R incident thereon to generate first and second electric currents ($i_1$ and $i_2$, respectively) on lines 62A, 62B. The magnitude of the signals on the lines 62A, 62B is functionally related to the position on the detector 60 at which the reflected laser beam 58R is incident and also to the power output of the laser source. Suitable for use as the laser 58 is the HeNe laser device formerly manufactured by Hughes Aircraft Corporation, of Carlsbad, Calif. and sold as 3221H-C 5 mW. Equivalent equipment is now believed available from Melles Griot of Irvine, Calif. The detector 60 is preferably implemented by a linear position sensor such as that manufactured and sold by Quantrad Incorporated of Los Angeles, Calif. as model PS-100-50.

Rotation of the galvanometer 46 is controlled by a galvanometer drive signal carried on a line 64 from a galvanometer position controller generally indicated by the reference character 66. The controller 66 is shown in more detail in FIGS. 5A and 5B. The controller 66 is responsive to the signals applied thereto on the lines 62A, 62B (which contain information as to the actual position of the mirror 44) and to a reference signal carried on a line 68 to generate the galvanometer drive signal on the line 64. As will be developed, the controller 66 permits the repeatable and accurate positioning of the mirror 44 whereby temporal interleaving of holographic images in accordance with the present method may be effected.

The controller 66 itself includes means generally indicated at reference character 70 (shown in FIG. 5A) responsive to the first and the second currents $i_1$ and $i_2$ for forming the ratio of the sum and difference thereof. The ratio is implemented using a ratio module such as that sold by Burr-Brown Inc. of Tucson, Ariz. as model number DIV100. This ratio action forms on a line 72 an actual mirror position signal that is independent of the power output of the laser source 58. It is noted that the signal on the line 72 is also independent of any thermal responses of the detector 60.

Figure 5A:
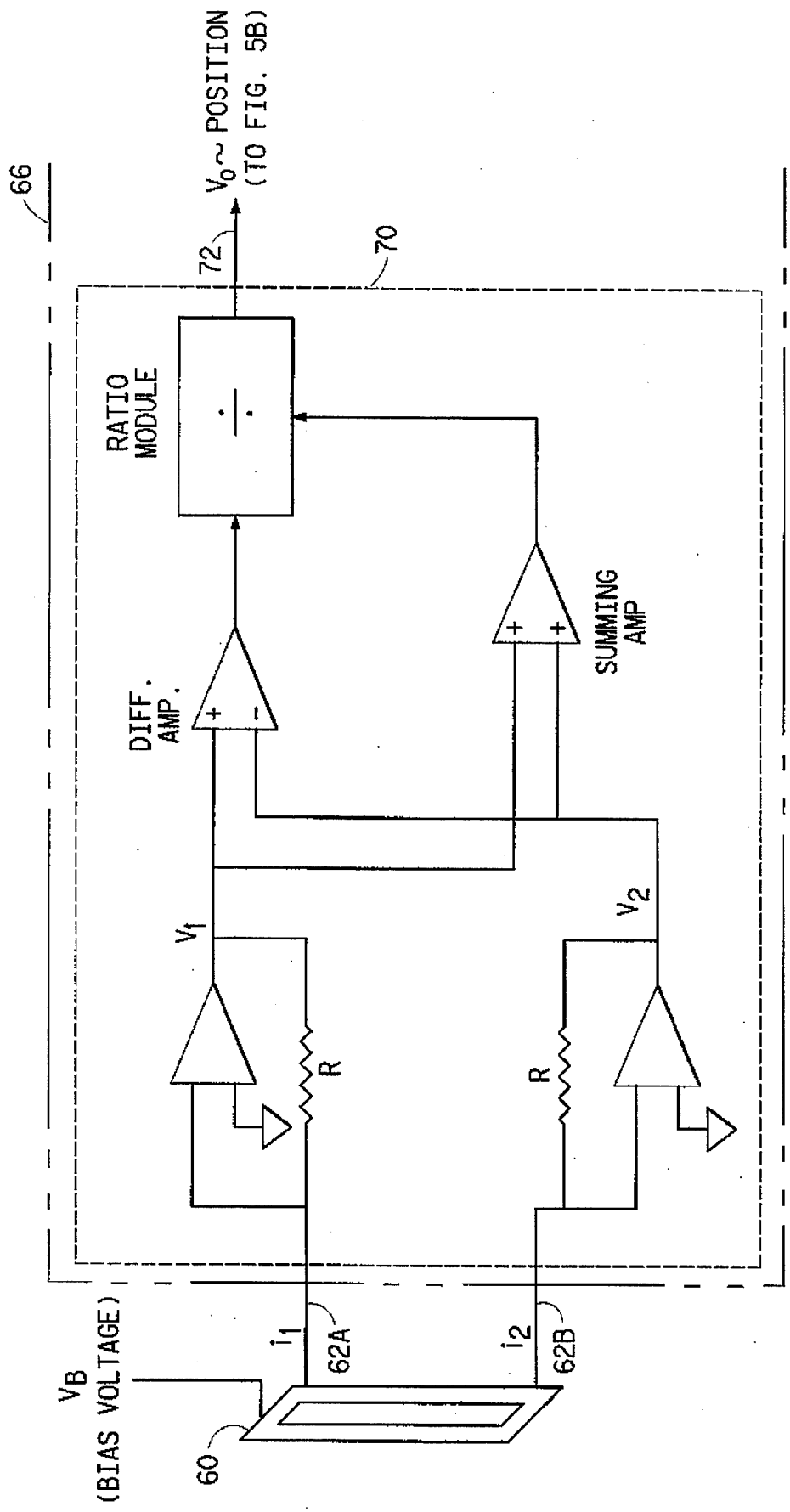
FIGS. 5A and 5B are a schematic diagram of a ratioing network and of a servo feedback control network for a galvanometer control system in accordance with the apparatus of the present invention and which are used in an apparatus for implementing the method of the present invention.
Figure 5B:
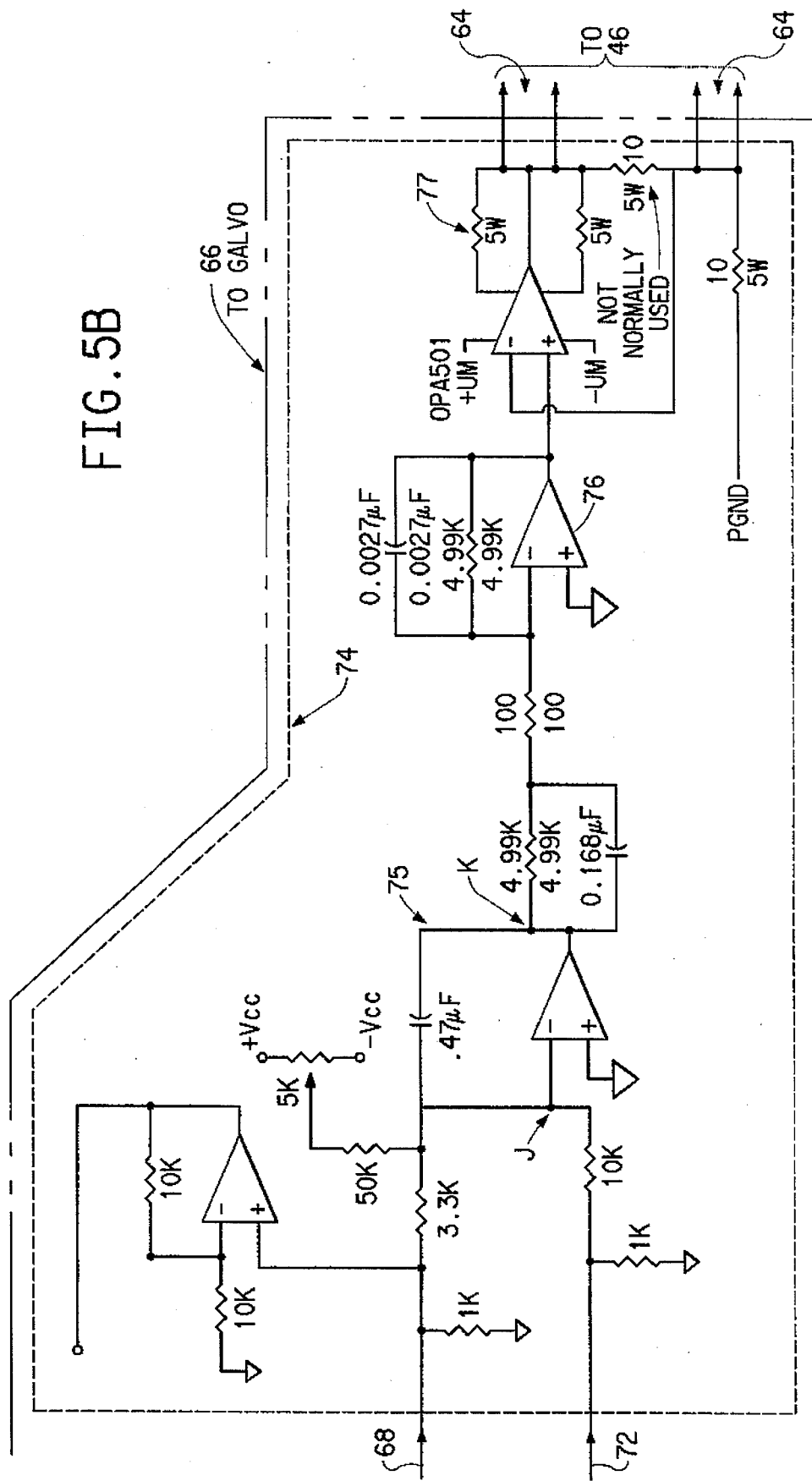

As seen in FIG. 5B, a module 74 within the controller 66 subtracts the actual mirror position signal 72 from the reference position signal on the line 68 to produce an error signal at a summing junction J. An integrator circuit 75 (FIG. 5B) produces a galvanometer position control signal at the output point K thereof. After dynamic response compensation in an amplifier 76 the galvanometer position control signal is input to the galvanometer servo amplifier 77 which produces the galvanometer drive signal on the line 64. The integrator 75 serves to maintain at least some drive voltage level to the amplifier 76 during those times when the galvanometer error signal (point J) is zero, thus maintaining the galvanometer 46 in the position that generates the zero position error.

The shutter 18 is controlled electronically by a shutter control signal applied on a line 79 from a shutter controller 78. Suitable for use as the shutter controller 78 is the device manufactured by Vincent Associates and sold as Model SD-10 Shutter Drive/Timer. The input timing signal to the shutter controller 78 is a timing pattern applied over a line 80 (typically at a standard logic level of five Volts) which controls the state of the shutter 18, i.e., whether the shutter 18 is open or closed.

If the number of holographic images N is two the galvanometer reference signal 68 and the timing signal 80 may be generated using a square wave generator 84 and a pulse generator 86. Suitable for use as the square wave generator 84 is the device manufactured by Textronix, Beaverton, Oreg. and sold as model FG502 while the pulse generator 86 may be implemented using a device manufactured by Hewlett-Packard, Palo Alto, Calif. and sold as model 8112A Pulse Generator.

Figure 6:
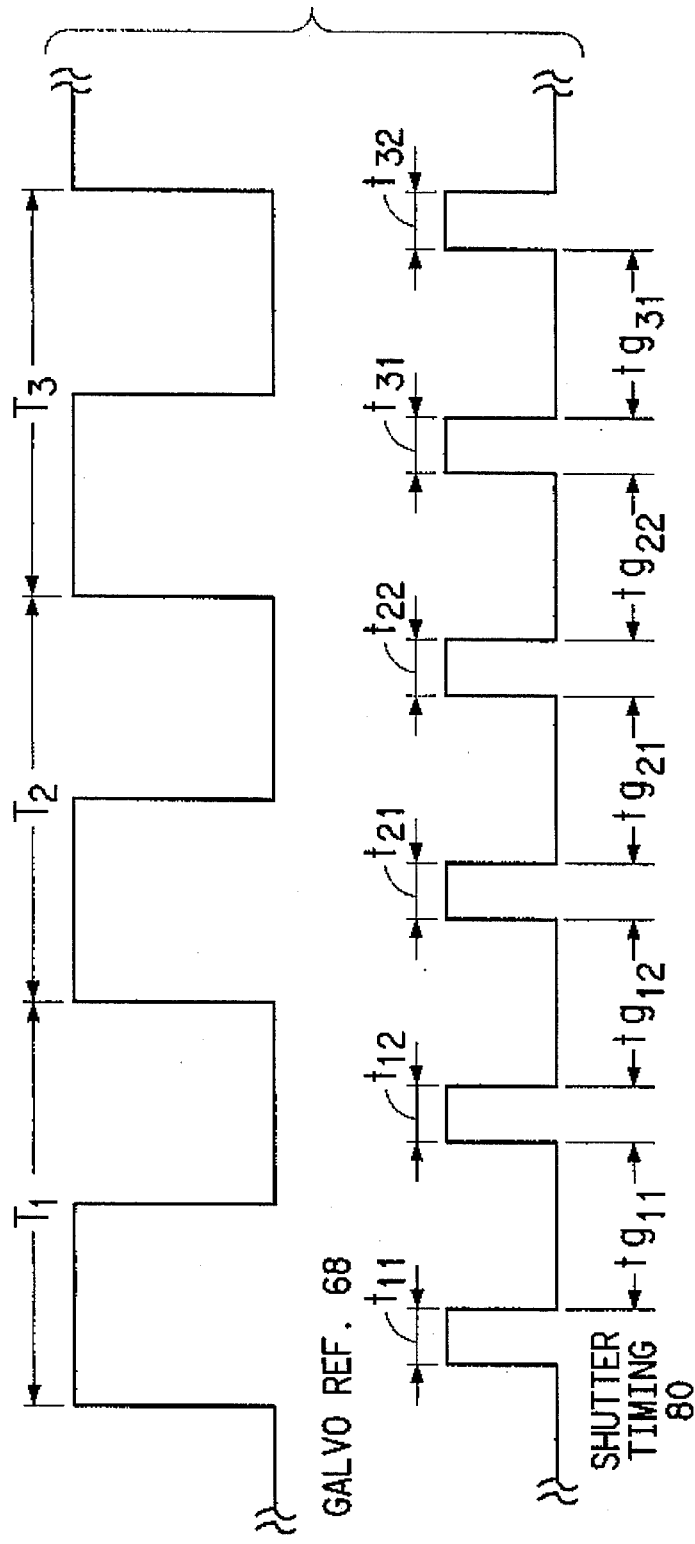
FIG. 6 is a timing diagram illustration the relationship between a galvanometer reference signal and a shutter timing signal used in the network of FIG. 5.

The square wave output is applied as the galvanometer reference signal on the line 68 and moves the galvanometer 46 (and thus the mirror 44), as described earlier. The square wave signal from the generator 84 is also used as the pulse generator trigger applied over a line 88 to the pulse generator 86. The pulse generator 86 triggers on both the positive and negative transitions of the square wave trigger signal 88, triggering one pulse during each image position (one half of the square wave). The output of the pulse generator 86 forms the shutter timing signal 80. The assertion of the shutter control signal on the line 79 in response to the input timing signal on the line 80 serves to open the normally closed shutter 18, thereby causing an image exposure to occur in the holographic recording material H. The duration of each pulse on the line 79 is equal to $t_{ij}$. The relationship of the waveforms of a galvanometer reference signal 68 and a shutter timing signal 80 is shown in FIG. 6 for an N equals 2 image embodiment.

It should be readily apparent to those skilled in the art that the galvanometer reference signal on the line 68 and the shutter timing signal on the 80 may be generated by a computer system, other conventional instrumentation, or any other convenient arrangement. For example, if N is greater than two, a microprocessor based system could drive, under program control, a plurality of digital-to-analog converters to provide the N shutter timing signals on the line 80. The microprocessor based system also can be used to expeditiously provide the galvanometer reference signal on the line 68. Moreover, if a spatially multiplexed hologram is being prepared, the microprocessor based system could also be used to provide appropriate indexing signals to the actuator(s) 38 associated with the plateholder 34.

It should thus be appreciated from the foregoing that by providing the appropriate electronic galvanometer reference signal on the line 68 and the appropriate shutter timing signal 80 any sequence of holographic exposures, exposure times, and gap times between exposures may be implemented using the apparatus 10. The apparatus 10 described above is suitable for practicing the method of the present invention whereby a predetermined number N of spatially and/or angularly multiplexed holographic images may be recorded into the holographic recording material H. The N different angularly multiplexed holographic images may be formed at the film plane when the mirror 44 is rotated by the action of the galvanometer 46 to each of N different positions. Spatially multiplexed holograms are recorded in separate regions of the material H in accordance with the translations effected by the actuator 38.

If, as preferred, a photopolymeric holographic recording material H is used to record the N multiplexed holographic images, temporal interleaving in accordance with the present invention overcomes the dynamic effects of the grating formation time-dependent diffusion process in the film, and records N hologram images in a repetitive sequential fashion. The sequence periods $T_p$ are made shorter than the diffusion mechanism in the material, thus minimizing undesired effects obtained with conventional sequential exposure of N holograms. This method avoids crosstalk effects of simultaneous exposure and the difficulty of generating N reference beams simultaneously.

Alternate embodiments of the apparatus 10 which one skilled in the art may easily implement include, among others: 1) spatial modulation of the object beam 30 and/or reference beam 42; 2) nonplanar wavefronts in the object beam path 30 and/or the reference beam path 42, (e.g. the object beam 30 is a converging spherical wavefront focusing at the film plane forming a Fourier transform hologram); 3) angle adjustment for the object beam 30, as for example, using the controller 66 as shown in FIGS. 5A and 5B; 4) angle adjustment for the film plane; and 5) non-unity angular magnification in imaging system 48.

—o—0—o—

The photopolymerizable materials used herein are thermoplastic compositions that upon exposure to actinic radiation form crosslinks or polymers of high molecular weight to change the refractive index and rheological character of the composition (s). Preferred photopolymerizable materials are photopolymerizable compositions, such as disclosed in U.S. Pat. No. 3,658,526 (Haugh) and more preferred materials are described copending application Ser. Nos. 07/144,355, 07/144,281 and 07/144,840, all filed Jan. 15, 1988 and all assigned to E. I. du Pont de Nemours and Company, Incorporated. In these materials, free radical addition polymerization and crosslinking of a compound containing one or more ethylenically unsaturated groups, usually in a terminal position, hardens and insolubilizes the composition. The sensitivity of the photopolymerizable composition is enhanced by the photoinitiating system which may contain a component which sensitizes the composition to predetermined radiation sources, e.g., visible light. Conventionally a binder is the most significant component of a substantially dry photopolymerizable base or layer in terms of what physical properties the base or layer will have while being used in the invention. The binder serves as a containing medium for the monomer and photoinitiator prior to exposure, provides the base line refractive index, and after exposure contributes to the physical and refractive index characteristics needed for the base layer or buffer layer. Cohesion, adhesion, flexibility, diffusibility, tensile strength and index of refraction are some of the many properties which determine if the binder is suitable for use in the base layer.

Photopolymerizable materials contemplated to be equivalent are photodimerizable or photocrosslinkable compositions such as disclosed in U.S. Pat. No. 3,526,504 (Celeste) or those compositions in which hardening is achieved by a mechanism other than the free radical initiated type identified above.

The photopolymerizable material is composed of three major components, a solid solvent-soluble preformed polymeric material, at least one liquid ethylenically unsaturated monomer capable of addition polymerization to produce a polymeric material with a refractive index substantially different from that of the preformed polymeric material, or binder, and a photoinitiator system activatable by actinic radiation. Although the base or layer is a solid composition, components interdiffuse before, during and after imaging exposure until they are fixed or destroyed by a final uniform treatment usually by a further uniform exposure to actinic radiation. Interdiffusion may be further promoted by incorporation into the composition of an otherwise inactive plasticizer.

In addition to the liquid monomer, the composition may contain solid monomer components capable of interdiffusing in solid composition and reacting with the liquid monomer to form a copolymer with a refractive index shifted from that of the binder.

In the preferred compositions for use in this invention, the preformed polymeric material and the liquid monomer are selected so that either the preformed polymeric material or the monomer contains one or more moieties taken from the group consisting essentially of substituted or unsubstituted phenyl, phenoxy, naphthyl, naphthyloxy, heteroaromatic groups containing one to three aromatic rings, chlorine, and bromine and wherein the remaining component is substantially free of the specified moieties. In the instance when the monomer contains these moieties, the photopolymerizable system hereinafter is identified as a "Monomer Oriented System" and when the polymeric material contains these moieties, the photopolymerizable system hereinafter is identified as a "Binder Oriented System."

The stable, solid, photopolymerizable compositions preferred for this invention will be more fully described by reference to the "Monomer Oriented System" and "Binder Oriented System."

The monomer of the Monomer Oriented System is a liquid, ethylenically unsaturated compound capable of addition polymerization and having a boiling point above 100° C. The monomer contains either a phenyl, phenoxy, naphthyl, naphthoxy, heteroaromatic group containing one to three aromatic rings, chlorine or bromine. The monomer contains at least one such moiety and may contain two or more of the same or different moieties of the group, provided the monomer remains liquid. Contemplated as equivalent to the groups are substituted groups where the substitution may be lower alkyl, alkoxy, hydroxy, carboxy, carbonyl, amino, amido, imido or combinations thereof provided the monomer remains liquid and diffusable in the photopolymerizable layer.

Preferred liquid monomers for use in the Monomer Oriented System of this invention are 2-phenoxyethyl acrylate, 2-phenoxyethyl methacrylate, phenol ethoxylate acrylate, 1-(p-chlorophenoxy) ethyl, p-chlorophenyl acrylate, phenyl acrylate, 1-phenylethyl acrylate, di(2-acryloxyethyl) either of bisphenol-A, and 2-(2-naphthyloxy) ethyl acrylate.

While monomers useful in this invention are liquids, they may be used in admixture with a second solid monomer of the same type, e.g., N-vinyl-carbzole, ethylenically unsaturated carbazole monomers such as disclosed in *Journal of Polymer Science: Polymer Chemistry Edition*, Vol. 18, pp. 9–18 (1979) by H. Kamagawa et al., 2-naphthyl acrylate, penta-chlorophenyl acrylate, 2,4,6-tribromophenyl acrylate, and bisphenol A diacrylate, 2-(2-naphthyloxy) ethyl acrylate, and N-phenyl maleimide.

The solvent soluble polymeric material or binder of the Monomer Oriented System is substantially free of phenyl, phenoxy, naphthyl, naphthyloxy, heteroaromatic group containing one to three aromatic rings, chlorine and bromine.

Preferred binders for use in the Monomer Oriented System of this invention are cellulose acetate butyrate polymers; acrylic polymers and inter polymers including polymethyl methacrylate, methyl methacrylate/methacrylic acid and methyl methacrylate/acrylic acid copolymers, terpolymers of methylmethacrylate/$C_2$–$C_4$ alkyl acrylate or methacrylate/acrylic or methacrylic acid; polyvinyl-acetate; polyvinyl acetal, polyvinyl butyral, polyvinyl formal; and as well as mixtures thereof.

The monomer of the Binder Oriented System is a liquid ethylenically unsaturated compound capable of addition polymerization and having a boiling point above 100° C. The monomer is substantially free of moieties taken from the group consisting essentially of phenyl, phenoxy, naphthyl, naphthyloxy, heteroaromatic group containing one to three aromatic rings chlorine and bromine.

Preferred liquid monomers for use in Binder Oriented Systems of this invention include decanediol diacrylate, isobornyl acrylate, triethylene glycol diacrylate, diethyleneglycol diacrylate, triethylene glycol dimethacrylate, ethoxyethoxyethyl acrylate, triacrylate ester of ethoxylated trimethylolpropane, and 1-vinyl-2-pyrrolidinone.

While monomers used in Binder Oriented Systems are liquids, they may be used in admixture with a second solid monomer of the same type, e.g., N-vinyl-caprolactam.

The solvent soluble polymeric material or binder of the Binder Oriented System contains in its polymeric structure moieties taken from the group consisting essentially of phenyl, phenoxy, naphthyl naphthyloxy or heteroaromatic group containing one to three aromatic rings as well as chloro or bromo atoms. Contemplated as equivalent to the groups are substituted groups where the substitution may be lower alkyl, alkoxy, hydroxy, carboxy, carbonyl, amido, imido or combinations thereof provided the binder remains solvent soluble and thermoplastic. The moieties may form part of the monomeric units which constitute the polymeric binder or may be grated onto a prepared polymer or interpolymer. The binder of this type may be a homopolymer or it may be an interpolymer of two or more separate monomeric units wherein at least one of the monomeric units contains one of the moieties identified above.

Preferred binders for use in the Binder Oriented System include polystyrene, poly (styrene/acrylonitrile), poly (styrene/methyl methacrylate), and polyvinyl benzal as well as admixtures thereof.

The same photoinitiator system activatable by actinic radiation may be used in either the Monomer Oriented System or the Binder Oriented System. Typically the photoinitiator system will contain a photoinitiator and may contain a sensitizer which extends the spectral response into the near U. V. region and the visible spectral regions.

Preferred photoinitiators include CDM-HABI, i.e., 2-(o-chlorophenyl)-4, 5-bis(m-methoxyphenyl)-imidazole dimer; o-Cl-HABI, i.e., 1,1'-Biimidazole, 2,2'-bis-(o-chlorophenyl)-4,4',5,5'-tetraphenyl-; and TCTM-HABI, i.e., 1H-Imidazole, 2,5-bis(o-chlorophenyl)-4-3,4-dimethoxyphenyl-, dimer each of which is typically used with a hydrogen donor, e.g., 2-mercapto-benzoxazole.

Preferred sensitizers include the following:

DBC, i.e., Cyclopentanone, 2,5-bis-((4-(diethylamino)-2-methylphenyl)methylene);

DEAW, i.e., Cyclopentanone, 2,5-bis-((4-(diethylamino)-phenyl)methylene); and

Dimethoxy-JDI, i.e., 1H-Inden-1-one, 2,3-dihydro-5,6-dimethoxy-2-((2,3,6,7-tetrahydro-1H,5H-benzo[i,j] quinolizin-9-yl)-methylene)-.

JAW, i.e., 2,5-bis[2,3,6,7-tetrahydro (1H, 5H-benzo[i,j,]quinolizin-9-yl) methylene]-cyclopentanone.

The solid photopolymerizable compositions of this invention may contain a plasticizer. Plasticizers of this invention may be used in amounts varying from about 2% to about 20% by weight of the compositions preferably 5 to 15 wt. %.

Preferred plasticizers for use in simple cellulose acetate butyrate systems are triethyleneglycol dicaprylate, tetraethyleneglycol diheptanoate, diethyl adipate, Brij®30 and tris-(2-ethylhexyl)phosphate. Similarly, triethyleneglycol dicaprylate, diethyl adipate, Brij®30, and tris-(2-ethylhexyl)phosphate are preferred in "Monomer Oriented Systems" where cellulose acetate butyrate is the binder.

Other components in addition to those described above can be present in the photopolymerizable compositions in varying amounts. Such components include: ultraviolet radiation absorbing material, thermal stabilizers, hydrogen donors, oxygen scavengers and release agents.

Amounts of ingredients in the photopolymerizable compositions will generally be within the following percentage ranges based on total weight of the photopolymerizable layer; monomer, 5–50%, preferably 15–35%; initiator 0.1–10%, preferably 1–5%; binder, 25–75%, preferably 45–65%; plasticizer, 0–25%, preferably 5–15%; other ingredients 0–5%, preferably 1–4%.

EXAMPLE

The holographic recording material as used in this example used a coating emulsion that had the ingredients as listed in the following Table 1:

TABLE 1

| Ingredient | % by weight in coating |
|---|---|
| Cellulose acetate butyrate, Eastman type CAB 531-1 | 51.90 |
| Ethoxylated phenol acrylate (Photomer 4039) | 26.93 |
| 9-Vinylcarbazole (NVC) | 6.00 |
| Ethoxylated bisphenol A diacrylate (Sartomer 349) | 9.97 |
| 4-Methyl-4H-1,2,4-triazole-3-thiol (MMT) | 2.52 |
| o-Cl HABI (1,1'-Biimidazole, 2,2'-bis-(o-chlorophenyl)-4,4', 5,5'-tetraphenyl; CAS 1707-68-2 | 2.48 |
| Fluorocarbon coating aid, Fluorad FC-430 (3M Inc.) | 0.10 |
| JAW dye 2,5-bis [2,3,6,7-tetrahydro (1H, 5H-benzo[i,j,]quinolizin-9-yl) | 0.10 |

TABLE 1-continued

| Ingredient | % by weight in coating |
|---|---|
| methylene]-cyclopentanone. | |

Figure 7:
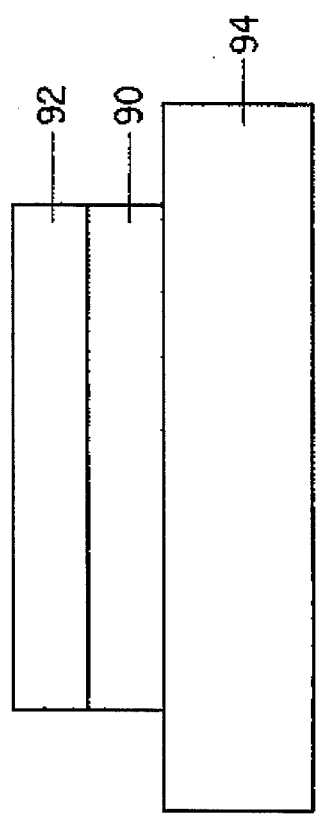
FIG. 7 is a schematic illustration of the holographic recording material as mounted for use in the Example.

FIG. 7 shows a holographic recording material comprising a thirty-eight (38) micron photopolymer emulsion 90 (ingredients given in Table 1) coated onto a 50.8 micron optical grade base 92 formed from a polyester film such as that manufactured and sold by E.I. Du Pont de Nemours and Company under the trademark Mylar®. The coating was cast from solvent (95% methylene chloride, 5% methanol) and the coating solution was 25% by weight emulsion, 75% solvent. The emulsion and base were laminated onto a 2"×2"×⅛ inch float glass plate 94, forming a glass-photopolymer-base sandwich as shown in FIG. 7. The plate was mounted in the plate holder 34 at the film plane with the base facing the incident beams. The experiment was performed under red safelight in the nonsensitive spectrum of the photopolymer.

The optical wavelength used for holographic image exposure was 514.5 nanometers generated by an Argon ion laser 12 with an intercavity etalon for single frequency operation. The power density of each of the respective reference and object beams 30 and 42 was approximately eighty (80) milliWatts per square centimeter.

Table 2 lists the results for nine (9) samples of multiplexing holographic images by temporal interleaving. For each sample, two holographic images (N=2) were multiplexed by temporal interleaving with sequence period, imaging, and gap times as indicated in Table 2. The reference and object beams 30 and 42 were each about five (5) millimeters in diameter. The plateholder was translated during the experiment to fit several multiplexed holograms onto the 2"×2" plate. The experiment beam angles: object beam angle 36 about fifteen (15) degrees; reference beam angle 50 of about 8.25 degrees for image j=1 (galvanometer mirror 44 directing the reference beam 42 at Position A in FIG. 4) and 21.75 degrees for image j=2 (Position B in FIG. 4).

TABLE 2

| HOLOGRAM SAMPLE NUMBER | IMAGING TIME $t_{ij}$ (msec) | GAP TIME $t_{gij}$ (msec) | SEQUENCE PERIOD $T_p$ (sec) | NUMBER OF PERIODS M | DIFFRACTION EFFICIENCY. (%) | |
|---|---|---|---|---|---|---|
| | | | | | image 1 | image 2 |
| 1 | 500 | 1000 | 3 | 5 | 9.3 | 19 |
| 2 | 250 | 1250 | 3 | 10 | 9.6 | 22 |
| 3 | 100 | 1400 | 3 | 20 | 12 | 27 |
| 4 | 500 | 1000 | 3 | 10 | 9.3 | 16 |
| 5 | 250 | 1250 | 3 | 20 | 11 | 21 |
| 6 | 100 | 1400 | 3 | 40 | 12 | 20 |
| 7 | 250 | 750 | 2 | 10 | 9.1 | 16 |
| 8 | 100 | 900 | 2 | 20 | 10 | 24 |
| 9 | 400 | 600 | 2 | 5 | 8.4 | 20 |

After imaging, the holograms were fixed by turning on room lights and exposing the photopolymer plate to a Hg lamp for approximately ten (10) minutes. The plate was reinserted into the apparatus identical to exposure. The object beam 30 was blocked and the diffraction efficiency was measured by reconstructing the multiplexed holograms with the reference beam 42 at incident angles corresponding to image j=1 (Position A) and image j=2 (Position B). The diffraction efficiency was calculated as the detected power measured in the first-order diffracted reconstruction of the object beam, divided by the sum of the detected first-order and zero-order (undiffracted from reference beam) powers.

The diffraction efficiencies reported for the nine (9) samples show that temporal interleaving is effective over a range of exposure parameters (imaging time, gap time, sequence, etc.), and that changes in those parameters will affect the results. No optimization of these parameters was performed in the experiments reported here, but it is expected that optimization is important for achieving the best possible results. Given the maximum possible refractive index modulation for the recording material used, the maximum diffraction efficiencies for the images in the samples are expected in the range of 30%–45%. The results obtained could be improved by optimizing the exposure parameters and other aspects of the experiment (in particular, the plate should be mounted such that the glass side of the plate faces the incident beams to eliminate the effect of base birefringence).

The results show that the temporal interleaving method is useful for multiplexing holograms, and works well for dynamic media such as a holographic photopolymeric recording material.

Those skilled in the art, having the benefit of the teachings of the present invention may impart numerous modifications thereto, it should be understood that such modifications lie within the contemplation of the present invention, as defined by the appended claims.

What is claimed is:

1. A method of recording a predetermined number N of holographic images into a holographic recording material, each holographic image comprising the interference pattern produced by the coherent addition of at least one object beam and at least one reference beam, wherein the object and reference beams have a unique angular and spatial relationship with each other, the method comprising the steps of:
   (a) constructing each one of a first set of holographic images into a predetermined defined region of the holographic recording material, each holographic image being constructed for a predetermined first imaging time with a predetermined first time gap being defined between each of the images; and
   (b) thereafter, constructing each one of a subsequent set of holographic images into the predetermined defined region of the holographic recording material, each holographic image in the subsequent set being constructed for a predetermined corresponding second imaging time with a predetermined second time gap being defined between each of the images,
   the first and subsequent sets of holographic images having at least one member in common.

2. The method of claim 1 wherein all of the images are constructed into the same predetermined defined region of the holographic recording material.

3. The method of claim 2 wherein all of the holographic images in the first set are included in the subsequent set.

4. The method of claim 3 wherein the sequence of the images in the first set is identical to the sequence of the images in the subsequent set.

5. The method of claim 2 wherein the predetermined first and second time gaps are equal.

6. The method of claim 2 wherein the predetermined first and second imaging times are equal.

7. The method of claim 2 further comprising the step of repeating step (b) a predetermined number of times.

8. The product of the process of claim 7.

9. The method of claim 2 wherein the holographic recording material is a photopolymerizable holographic recording material comprising:
   (a) a polymeric binder;
   (b) a liquid ethylenically unsaturated monomer, the monomer being capable of free-radical initiated addition polymerization; and
   (c) a photoinitiator system that activates polymerization of said unsaturated monomer on exposure to actinic radiation.

10. The method of claim 2 wherein the holographic recording material is a photopolymerizable holographic recording material comprising:
    (a) a polymeric binder selected from the group consisting of cellulose esters, polystyrene, stryene copolymers containing at least 60% by weight styrene, polymethyl methacrylate, polyvinylbutryal, polyvinylformal, polyvinyl acetate and copolymers of vinyl acetate with tetrafluoroethylene and hexafluoropropylene containing up to about 25% by weight fluorine;
    (b) a liquid ethylenically unsaturated monomer, the monomer being capable of free-radical initiated addition polymerization; and
    (c) a photoinitiator system that activates polymerization of said unsaturated monomer on exposure to actinic radiation.

11. The product of the process of claim 2.

12. The method of claim 1 wherein the predetermined defined region into which each of the N images is constructed is separate from all other regions of the holographic recording material.

13. The method of claim 12 wherein all of the holographic images in the first set are included in the subsequent set.

14. The method of claim 13 wherein the sequence of the images in the first set is identical to the sequence of the images in the subsequent set.

15. The method of claim 12 wherein the predetermined first and second time gaps are equal.

16. The method of claim 12 wherein the predetermined first and second imaging times are equal.

17. The method of claim 12 further comprising the step of repeating step (b) a predetermined number of times.

18. The product of the process of claim 17.

19. The method of claim 12 wherein the holographic recording material is a photopolymerizable holographic recording material comprising:
    (a) a polymeric binder;
    (b) a liquid ethylenically unsaturated monomer, the monomer being capable of free-radical initiated addition polymerization; and
    (c) a photoinitiator system that activates polymerization of said unsaturated monomer on exposure to actinic radiation.

20. The method of claim 12 wherein the holographic recording material is a photopolymerizable holographic recording material comprising:

(a) a polymeric binder selected from the group consisting of cellulose esters, polystyrene, stryene copolymers containing at least 60% by weight styrene, polymethyl methacrylate, polyvinylbutryal, polyvinylformal, polyvinyl acetate and copolymers of vinyl acetate with tetrafluoroethylene and hexafluoropropylene containing up to about 25% by weight fluorine;

(b) a liquid ethylenically unsaturated monomer, the monomer being capable of free-radical initiated addition polymerization; and (c) a photoinitiator system that activates polymerization of said unsaturated monomer on exposure to actinic radiation.

21. The product of the process of claim 12.

22. The method of claim 1 wherein some of the N images are constructed in the same physical region of the holographic recording material and each one of the others of the N images are constructed in spatially separate regions of holographic recording material.

23. The method of claim 22 wherein all of the holographic images in the first set are included in the subsequent set.

24. The method of claim 23 wherein the sequence of the images in the first set is identical to the sequence of the images in the subsequent set.

25. The method of claim 22 wherein the predetermined first and second gap times are equal.

26. The method of claim 22 wherein the predetermined first and second imaging times are equal.

27. The method of claim 22 further comprising the step of repeating step (b) a predetermined number of times.

28. The product of the process of claim 27.

29. The method of claim 22 wherein the holographic recording material is a photopolymerizable holographic recording material comprising:

(a) a polymeric binder;

(b) a liquid ethylenically unsaturated monomer, the monomer being capable of free-radical initiated addition polymerization; and (c) a photoinitiator system that activates polymerization of said unsaturated monomer on exposure to actinic radiation.

30. The method of claim 22 wherein the holographic recording material is a photopolymerizable holographic recording material comprising:

(a) a polymeric binder selected from the group consisting of cellulose esters, polystyrene, stryene copolymers containing at least 60% by weight styrene, polymethyl methacrylate, polyvinylbutryal, polyvinylformal, polyvinyl acetate and copolymers of vinyl acetate with tetrafluoroethylene and hexafluoropropylene containing up to about 25% by weight fluorine;

(b) a liquid ethylenically unsaturated monomer, the monomer being capable of free-radical initiated addition polymerization; and (c) a photoinitiator system that activates polymerization of said unsaturated monomer on exposure to actinic radiation.

31. The product of the process of claim 22.

32. The method of claim 1 wherein all of the holographic images in the first set are included in the subsequent set.

33. The method of claim 32 wherein the sequence of the images in the first set is identical to the sequence of the images in the subsequent set.

34. The method of claim 1 wherein the predetermined first and second time gaps are equal.

35. The method of claim 1 wherein the predetermined first and second imaging times are equal.

36. The method of claim 1 further comprising the step of repeating step (b) a predetermined number of times.

37. The product of the process of claim 36.

38. The method of claim 1 wherein the holographic recording material is a photopolymerizable holographic recording material comprising:

(a) a polymeric binder;

(b) a liquid ethylenically unsaturated monomer, the monomer being capable of free-radical initiated addition polymerization; and (c) a photoinitiator system that activates polymerization of said unsaturated monomer on exposure to actinic radiation.

39. The method of claim 1 wherein the holographic recording material is a photopolymerizable holographic recording material comprising:

(a) a polymeric binder selected from the group consisting of cellulose esters, polystyrene, stryene copolymers containing at least 60% by weight styrene, polymethyl methacrylate, polyvinylbutryal, polyvinylformal, polyvinyl acetate and copolymers of vinyl acetate with tetrafluoroethylene and hexafluoropropylene containing up to about 25% by weight fluorine;

(b) a liquid ethylenically unsaturated monomer, the monomer being capable of free-radical initiated addition polymerization; and (c) a photoinitiator system that activates polymerization of said unsaturated monomer on exposure to actinic radiation.

40. The product of the process of claim 1.

41. A method of recording a predetermined number N of holographic images into a holographic recording material, each holographic image comprising the interference pattern produced by the coherent addition of at least one object beam and at least one reference beam, wherein the object and reference beams have a unique angular and spatial relationship with each other, the method comprising the steps of:

(a) in accordance with a first predetermined sequence, constructing each one of a set of N holographic images into a predetermined defined region of the holographic recording material, each holographic image being constructed for a predetermined first imaging time with a predetermined first time gap being defined between each of the images; and (b) thereafter, in accordance with a subsequent predetermined sequence, constructing each one of a predetermined number of the set of N holographic images into the predetermined defined region of the holographic recording material, each holographic image in the subsequent sequence being constructed for a predetermined corresponding second imaging time with a predetermined second time gap being defined between each of the images.

42. The method of claim 41 wherein all of the images are constructed into the same predetermined defined region of the holographic recording material.

43. The method of claim 42 wherein the predetermined number of the set of N holographic images constructed during the subsequent sequence is equal to N.

44. The method of claim 43 wherein the subsequent sequence is identical to the first sequence.

45. The method of claim 42 wherein the predetermined first and second nine gaps are equal.

46. The method of claim 42 wherein the predetermined first and second imaging times are equal.

47. The method of claim 42 further comprising the step of repeating step (b) a predetermined number of times.

48. The product of the process of claim 47.

49. The method of claim 42 wherein the holographic recording material is a photopolymerizable holographic recording material comprising:
   (a) a polymeric binder;
   (b) a liquid ethylenically unsaturated monomer, the monomer being capable of free-radical initiated addition polymerization; and
   (c) a photoinitiator system that activates polymerization of said unsaturated monomer on exposure to actinic radiation.

50. The method of claim 42 wherein the holographic recording material is a photopolymerizable holographic recording material comprising:
   (a) a polymeric binder selected from the group consisting of cellulose esters, polystyrene, stryene copolymers containing at least 60% by weight styrene, polymethyl methacrylate, polyvinylbutryal, polyvinylformal, polyvinyl acetate and copolymers of vinyl acetate with tetrafluoroethylene and hexafluoropropylene containing up to about 25% by weight fluorine;
   (b) a liquid ethylenically unsaturated monomer, the monomer being capable of free-radical initiated addition polymerization; and
   (c) a photoinitiator system that activates polymerization of said unsaturated monomer on exposure to actinic radiation.

51. The product of the process of claim 42.

52. The method of claim 41 wherein the predetermined defined region into which each of the N images is constructed is separate from all other regions of the holographic recording material.

53. The method of claim 52 wherein the predetermined number of the set of N holographic images constructed during the subsequent sequence is equal to N.

54. The method of claim 53 wherein the subsequent sequence is identical to the first sequence.

55. The method of claim 52 wherein the predetermined first and second time gaps are equal.

56. The method of claim 52 wherein the predetermined first and second imaging times are equal.

57. The method of claim 52 further comprising the step of repeating step (b) a predetermined number of times.

58. The product of the process of claim 57.

59. The method of claim 52 wherein the holographic recording material is a photopolymerizable holographic recording material comprising:
   (a) a polymeric binder;
   (b) a liquid ethylenically unsaturated monomer, the monomer being capable of free-radical initiated addition polymerization; and
   (c) a photoinitiator system that activates polymerization of said unsaturated monomer on exposure to actinic radiation.

60. The method of claim 52 wherein the holographic recording material is a photopolymerizable holographic recording material comprising:
   (a) a polymeric binder selected from the group consisting of cellulose esters, polystyrene, stryene copolymers containing at least 60% by weight styrene, polymethyl methacrylate, polyvinylbutryal, polyvinylformal, polyvinyl acetate and copolymers of vinyl acetate with tetrafluoroethylene and hexafluoropropylene containing up to about 25% by weight fluorine;
   (b) a liquid ethylenically unsaturated monomer, the monomer being capable of free-radical initiated addition polymerization; and
   (c) a photoinitiator system that activates polymerization of said unsaturated monomer on exposure to actinic radiation.

61. The product of the process of claim 52.

62. The method of claim 41 wherein some of the N images are constructed in the same physical region of the holographic recording material and each one of the others of the N images are constructed in spatially separate regions of holographic recording material.

63. The method of claim 62 wherein the predetermined number of the set of N holographic images constructed during the subsequent sequence is equal to N.

64. The method of claim 63 wherein the subsequent sequence is identical to the first sequence.

65. The method of claim 62 wherein the predetermined first and second gap times are equal.

66. The method of claim 62 wherein the predetermined first and second imaging times are equal.

67. The method of claim 62 further comprising the step of repeating step (b) a predetermined number of times.

68. The product of the process of claim 67.

69. The method of claim 62 wherein the holographic recording material is a photopolymerizable holographic recording material comprising:
   (a) a polymeric binder;
   (b) a liquid ethylenically unsaturated monomer, the monomer being capable of free-radical initiated addition polymerization; and
   (c) a photoinitiator system that activates polymerization of said unsaturated monomer on exposure to actinic radiation.

70. The method of claim 62 wherein the holographic recording material is a photopolymerizable holographic recording material comprising:
   (a) a polymeric binder selected from the group consisting of cellulose esters, polystyrene, stryene copolymers containing at least 60% by weight styrene, polymethyl methacrylate, polyvinylbutryal, polyvinylformal, polyvinyl acetate and copolymers of vinyl acetate with tetrafluoroethylene and hexafluoropropylene containing up to about 25% by weight fluorine;
   (b) a liquid ethylenically unsaturated monomer, the monomer being capable of free-radical initiated addition polymerization; and
   (c) a photoinitiator system that activates polymerization of said unsaturated monomer on exposure to actinic radiation.

71. The product of the process of claim 62.

72. The method of claim 41 wherein the predetermined number of the set of N holographic images constructed during the subsequent sequence is equal to N.

73. The method of claim 72 wherein the subsequent sequence is identical to the first sequence.

74. The method of claim 41 wherein the predetermined first and second rime gaps are equal.

75. The method of claim 41 wherein the predetermined first and second imaging times are equal.

76. The method of claim 41 further comprising the step of repeating step (b) a predetermined number of times.

77. The product of the process of claim 76.

78. The method of claim 41 wherein the holographic recording material is a photopolymerizable holographic recording material comprising:

(a) a polymeric binder;

(b) a liquid ethylenically unsaturated monomer, the monomer being capable of free-radical initiated addition polymerization; and (c) a photoinitiator system that activates polymerization of said unsaturated monomer on exposure to actinic radiation.

79. The method of claim 41 wherein the holographic recording material is a photopolymerizable holographic recording material comprising:

(a) a polymeric binder selected from the group consisting of cellulose esters, polystyrene, stryene copolymers containing at least 60% by weight styrene, polymethyl methacrylate, polyvinylbutryal, polyvinylformal, polyvinyl acetate and copolymers of vinyl acetate with tetrafluoroethylene and hexafluoropropylene containing up to about 25% by weight fluorine;

(b) a liquid ethylenically unsaturated monomer, the monomer being capable of free-radical initiated addition polymerization; and (c) a photoinitiator system that activates polymerization of said unsaturated monomer on exposure to actinic radiation.

80. The product of the process of claim 41.

81. A method of recording a predetermined number N of holographic images into a predetermined region of a holographic recording material, each holographic image comprising the interference pattern produced by the coherent addition of at least one object beam and at least one reference beam, wherein the object and reference beams have a unique angular and spatial relationship with each other, the method comprising the steps of:

(a) in accordance with a first predetermined sequence, constructing each one of a set of N holographic images into the same predetermined defined region of the holographic recording material, each holographic image being constructed into the predetermined region for a predetermined corresponding first imaging time with a predetermined first time gap being defined between each of the images; and (b) thereafter, in accordance with a second predetermined sequence, constructing each one of the set of N holographic images into the same predetermined defined region of the holographic recording material, each holographic image being constructed for a predetermined corresponding second imaging time with a predetermined second time gap being defined between each of the images.

82. The method of claim 81 wherein the predetermined first and second imaging times are equal.

83. The method of claim 81 wherein the predetermined first and second time gaps are equal.

84. The method of claim 81 further comprising the step of repeating step (b) a predetermined number of times.

85. A method of recording a predetermined number N of holographic images into a holographic recording material, each holographic image comprising the interference pattern produced by the coherent addition of at least one object beam and at least one reference beam, wherein the object and reference beams have a unique angular and spatial relationship with each other, the holographic recording material having a corresponding number N of regions, the method comprising the steps of:

(a) in accordance with a first predetermined sequence, constructing each one of the set of N holographic images into a respective region of the recording material, each image being constructed for a predetermined corresponding first imaging time with a predetermined first time gap being defined between each of the images, and (b) thereafter, in accordance with a second predetermined sequence, constructing each one of the set of N holographic images into the holographic material, each image being constructed into the respective region into which it was constructed during the first sequence for a predetermined corresponding second imaging time with a predetermined second time gap being defined between each of the images.

86. The method of claim 85 wherein the predetermined first and second imaging times are equal.

87. The method of claim 85 wherein the predetermined first and second time gaps are equal.

88. The method of claim 85 further comprising the step of repeating step (b) a predetermined number of times.

* * * * *